United States Patent [19]

Horlbeck et al.

[11] 4,434,276
[45] Feb. 28, 1984

[54] PROCESS FOR THE CONDENSATION OF POLY(ALKYLENE TEREPHTHALATES)

[75] Inventors: Gernot Horlbeck; Horst Heuer, both of Haltern, Fed. Rep. of Germany

[73] Assignee: Chemische Werke Huels Aktiengesellschaft, Marl, Fed. Rep. of Germany

[21] Appl. No.: 481,111

[22] Filed: Mar. 31, 1983

[30] Foreign Application Priority Data

Mar. 31, 1982 [DE] Fed. Rep. of Germany ....... 3211899

[51] Int. Cl.$^3$ .............................................. C08G 63/26
[52] U.S. Cl. .................................... 525/437; 528/272; 528/286; 528/287; 528/308.5; 528/480; 528/483; 528/487; 528/490
[58] Field of Search ................ 525/437; 528/487, 272, 528/480, 483, 308.5, 490, 286, 287

[56] References Cited

U.S. PATENT DOCUMENTS

| | | | |
|---|---|---|---|
| 4,328,059 | 5/1982 | Horlbeck et al. | 528/487 X |
| 4,360,661 | 11/1982 | Horlbeck et al. | 528/490 X |
| 4,387,213 | 6/1983 | Horlbeck et al. | 525/437 |

*Primary Examiner*—Lucille M. Phynes
*Attorney, Agent, or Firm*—Millen & White

[57] ABSTRACT

A process for the post condensation of poly(alkylene terephthalate) in the solid phase is carried out in the presence of esters of phosphorous acid at 25°–65° C. below the melting point of the poly(alkylene terephthalate) while passing an inert gas stream through the reaction mixture.

13 Claims, No Drawings

PROCESS FOR THE CONDENSATION OF POLY(ALKYLENE TEREPHTHALATES)

BACKGROUND OF THE INVENTION

The present invention relates to a process for the condensation of linear poly(alkylene terephthalate) having a viscosity number of at least 50 cm$^3$/g in the solid phase at elevated temperature.

Poly(alkylene terephthalate), especially poly(ethylene terephthalate) (PETP) and poly(butylene terephthalate) (PBTP) are excellent materials for the manufacture of films, sheets, molded components, etc. The poly(alkylene terephthalate) generally must exhibit a viscosity number > 100 cm$^3$/g, especially when producing molded components by the injection molding and extrusion methods.

Poly(alkylene terephthalates) are customarily prepared by transesterification or esterification and subsequent polycondensation of terephthalic acid or their polyester-forming derivatives and an alkanediol in the presence of catalysts [See, e.g. Sorensen and Campbell, Preparative Methods of Polymer Chemistry, Interscience Publishers, Inc., NY (1961), pp. 111-127; "Kunststoff-Handbuch" [Plastics Manual], vol. VIII, C. Hanser Publishers, Munich (1973), all of whose disclosures are incorporated by reference herein].

When using these processes, conducted in the melt, viscosities of the magnitude required, for example, for injection molding and extrusion purposes, cannot be reached since degradation reactions occur as early as in the polycondensation stage due to the temperature load. The desired high viscosity cannot be attained.

Another limitation on the viscosity of the polyesters in the melt condensation process is a result of the viscosity of the melt. This increases with progressive polycondensation, making it difficult and/or impossible for the volatile, low-molecular weight reaction products to escape, and thereby impeding the progress of the polycondensation. Furthermore, difficulties are encountered technically in discharging the highly viscous melt from the reaction vessel (DOS No. 2,117,748).

Insofar as necessary, a solid-phase post condensation (recondensation) is usually conducted to alleviate the problems (British Pat. No. 1,066,162; U.S. Pat. No. 3,405,098). This is done by bringing the polyester, in granulated or powder form, to temperatures lying approximately 10°-60° C. below the melting point. In this temperature range, the poly(alkylene terephthalate) is treated in the inert gas stream or under a vacuum until the desired high viscosity has been reached. See, e.g., U.S. Application Ser. No. 219,133, now U.S. Pat. No. 4,387,213 granted June 7, 1983 and U.S. Pat. No. 4,360,661, both commonly assigned for processes involving such a treatment in an inert gas stream in the presence of alkanediols in two steps.

The post condensation, or recondensation, can take place discontinuously, for example in a tumbler dryer (DOS No. 2,117,748) or continuously, for example in a fluidized bed process (DOS No. 1,804,551) or in a screw-type-reactor (DOS No. 2,162,618).

A basic disadvantage of the solid-phase recondensation resides in the long reaction period at an elevated temperature. As a result, although a poly(alkylene terephthalate) of the desired viscosity is obtained, the product is already damaged to such an extent that it is strongly degraded when being processed from the melt. Molded components made of such a material are brittle and prone to breakage.

Therefore, it has been proposed to use poly(alkylene terephthalates) in the ground form in order to shorten the recondensation time; however, this process is uneconomical. In addition, there is the danger of caking of the powder (DOS Nos. 2,152,245 and 2,117,748).

In another process the polyester is reacted after the recondensation with monofunctional glycidyl ethers or carbonates to improve the stability of the polyester (DOS No. 1,929,149). This method is time consuming and requires the use of compounds foreign to the polyester.

SUMMARY OF THE INVENTION

Accordingly, it is an object of the present invention to provide a solid-phase recondensation process wherein the desired high-molecular weight poly(alkylene terephthalate) is obtained in a small time period at economical temperatures.

Upon further study of the specification and appended claims, further objects and advantages of this invention will become apparent to those skilled in the art.

These objects have been attained by condensing the poly(alkylene terephthalate) in an inert gas stream at temperatures 25°-65° C. below the melting point of the poly(alkylene terephthalate), with the addition of 0.5-5% by weight, based on the amount of the poly(alkylene terephthalate), of an ester of phosphorous acid and phenols or aliphatic or cycloaliphatic alcohols, wherein the amount of inert gas passed through per hour, measured under normal conditions corresponds to 0.5-1.5 times the gross reactor volume.

DETAILED DISCUSSION

Esters of phosphorous acid which are usable according to this invention include the triesters of the formula

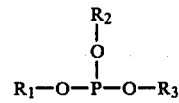

wherein R$_1$, R$_2$, and R$_3$ can be identical or different. These substituents can be linear or branched alkyl residues, unsubstituted aryl or cycloalkyl residues, or aryl or cycloalkyl residues substituted by alkyl, cyclohexyl, phenyl, or phenylalkyl groups. Preferably, when there is substitution on aryl or cycloalkyl, there are 1-3 substituents. In all of the aforementioned entities, the alkyl portions have 1-12 carbon atoms; the cycloalkyl groups contain 5-12 carbon atoms in the ring. The aryl groups have 6-10 carbon atoms in the ring(s).

Examples of suitable alkyl groups include methyl, ethyl, propyl, isopropyl, tert-butyl, nonyl, dodecyl, etc. If the esters have substituents R$_1$ through R$_3$, all of which are alkyl groups, the total number of carbon atoms in all three substituents is at least 12.

Examples of unsubstituted aryl or cycloalkyl groups and of aryl or cycloalkyl residues substituted by alkyl groups include phenyl, α- or β-napthyl, cyclopentyl, cyclohexyl, cyclododecyl, o-, m-, or p-methylphenyl, or 2,4- or 4,6-dimethylphenyl, etc.

Preferably, unsubstituted and/or substituted aryl phosphites are employed. Preferred individual compounds are triphenyl phosphite, tris(cresyl) phosphite, tris(tert-butylphenyl) phosphite, or tris(nonylphenyl) phosphite.

The esters of phosphorous acid are added in amounts of 0.5–5% by weight, preferably 1–3% by weight, based on the amount of poly(alkylene terephthalate).

The reaction temperature usually is 25°–65° C., preferably 35°–55° C., below the melting point of the poly(alkylene terephthalate) employed.

An especially suitable inert gas is nitrogen, as usually employed for polycondensation reactions. However, other inert gases can likewise be utilized. The amount of inert gas passed through per hour, measured under normal conditions, corresponds to 0.5–1.5 times, preferably 0.6–1.3 times the gross reactor volume. These volume data for the amount of inert gas passed through do not relate to the actual reaction conditions, but rather are based on normal conditions, i.e., 0° C. and 1013 mbar. The actual pressure in the reactor generally is atmospheric pressure up to 1250 mbar.

Typical reaction times for the solid-phase recondensation according to this invention is about 3–10 hours, preferably 5–8 hours, depending on the combination of aforementioned parameters actually used and the reaction change as can be determined fully conventionally and routinely.

Poly(alkylene terephthalates) suitable for the recondensation of this invention, preferably poly(ethylene terephthalate) and poly(butylene terephthalate), are produced according to customary melt polycondensation methods. They are to have a viscosity number of at least 50 cm$^3$/g, preferably at least 65 cm$^3$/g.

Up to 30 mole % of terephthalic acid in the poly(alkylene terephthalates) can be replaced by other conventional dicarboxylic acids. Examples of suitable dicarboxylic acids include isophthalic acid, phthalic acid, 1,4-cyclohexanedicarboxylic acid, adipic acid, sebacic acid, or decanedicarboxylic acid.

The diol component is derived from alkanediols of 2–12 carbon atoms in the carbon chain; in this connection, ethylene glycol and/or 1,4-butanediol are preferred. Up to 30 mole % of the diol component of the respective poly(alkylene terephthalate) can be replaced by other diols, e.g. neopentyl glycol, 1,5-pentanediol, 1,6-hexanediol, 1,4- or 1,3-dimethylolcyclohexane, or 1,12-dodecanediol.

The term poly(alkylene terephthalate) here is fully conventional, meaning, e.g., it also covers block copolyesters. Such products are described, for example, in Chimia 28 (9): 544-552 (1974) and in Rubber Chemistry and Technology 50: 688-703 (1977), which disclosures are incorporated by reference herein. These block copolyesters contain, in addition to the above-mentioned aromatic dicarboxylic acids and diols, a poly(oxyalkylene)diol having a molecular weight in the range of about 600 to 2,500. Preferred poly(oxyalkylene)diols are poly(oxyethylene)diol, poly(oxypropylene)diol, and poly(oxytetramethylene)diol. The proportion of the poly(oxyalkylene)diols is usually in the range from 4 to 40% by weight, preferably 10–35% by weight (based on the total weights of the aforementioned block copolyester).

The linear poly(alkylene terephthalates) utilized in the process of this invention can also contain auxiliary agents and additives. Suitable agents for this purpose include, for example, nucleators, matting compounds, flow agents, or other processing aids, as well as pigments, fillers and reinforcing compounds, and similar materials.

Nucleating agents, flatting agents, flowing agents, or other processing aids are contained in the polyalkylene terephthalate in amounts of up to 6% by weight, preferably 0.2–3.5% by weight, based on the weight of the total mixture.

Pigments, fillers, and reinforcing agents or similar compounds are contained in the polyalkylene terephthalate in amounts of up to 60% by weight, preferably 1–50% by weight, again based on the weight of the total mixture.

The process of this invention produces highly viscous, stable poly(alkylene terephthalates) suitable, in particular, for processing by extrusion, in shorter reaction periods and at lower temperatures than in the processes known heretofore. Typically, the viscosity numbers of the final products are 120–200 cm$^3$/g.

The parameters mentioned in the specification and in the following examples were determined in accordance with the measuring methods set out below:

The melting point ($T_m$) is the melt maximum of the polyester determined by differential scanning calorimetry (DSC) (heating rate: 16° C./minute).

The viscosity numbers (J) were measured in solutions of 0.23 g of poly(alkylene terephthalate) in 100 ml of phenol/1,1,2,2-tetrachloroethane (weight ratio 60:40) at 25° C.

The nitrogen quantities were measured under normal conditions—0° C. and 1013 mbar.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

Experiments designated by letters are not in accordance with the invention.

Tests 1–3

In a 0.5 m$^3$ tumbler dryer, 120 kg of poly(butylene terephthalate) (J=92 cm$^3$/g; $T_m$=225° C.) is combined with the amount of triphenyl phosphite indicated in Table 1, heated to the reaction temperature in a nitrogen stream (throughput see Table 1) and condensed under these conditions for 10 hours.

Test A

As in Tests 1–3, 120 kg of a poly(butylene terephthalate) is recondensed in a 0.5 m$^3$ tumbler dryer at 180° C. and 0.5 m$^3$/h N$_2$ for 10 hours, without the addition of triphenyl phosphite.

Tests 4–7

Respectively 50 g of granulated poly(butylene terephthalate) (J=92 cm$^3$/g; $T_m$=225° C.) is introduced into a 250-cc round flask and combined with 2% by weight of triphenyl phosphite. The granulated product is recondensed in a nitrogen stream (0.25 l/h) while the flask is revolving for 5 hours, at the temperature indicated in Table 2.

Tests B and C (Table 2)

Respectively 50 g of the granulated poly(butylene terephthalate) also employed for Tests 4–7 is recondensed without adding triphenyl phosphite, the other conditions remaining the same.

Tests 8-11 (Table 3)

Respectively 50 g of granulated poly(butylene terephthalate) (J=92 cm$^3$/g; T$_m$=225° C.) is introduced into a 250 cm$^3$ round flask and combined with various amounts of triphenylphosphite. Subsequently, the temperature was raised to 180° C. and the sample was recondensed at this temperature in a N$_2$-stream (0.25 l/h) for five hours while the flask was revolving.

Tests 12 and 13 (Table 4)

50 g of poly(butylene terephthalate) (J=88 cm$^3$/g; T$_m$=225° C.) is recondensed according to the procedure of Tests 3-7 at 180° C. and under a nitrogen stream of 0.25 l/h in the presence of the indicated amounts of triphenyl phosphite; samples are taken after 1, 3, and 5 hours; the increase in solution viscosity of these samples is taken as a measure for the progression of the condensation.

Tests 14-17 (Table 5)

In these tests, poly(ethylene terephthalate) and various copolyesters are recondensed in accordance with this invention under the reaction conditions set out in Table 5.

TABLE 1

| Test | Triphenyl Phosphite Added [% by Wt.] | N$_2$ Throughput [m$^3$/h] | Reaction Temperature [°C.] | J [cm$^3$/g] |
|---|---|---|---|---|
| 1 | 2 | 0.5 | 190 | 158 |
| 2 | 2 | 0.5 | 180 | 145 |
| 3 | 1.5 | 0.3 | 180 | 135 |
| A | — | 0.5 | 180 | 107 |

Mode of Operation

TABLE 2

Effect of Reaction Temperature on PBTP Condensation

| Test | Reaction Temperature [°C.] | J [cm$^3$/g] |
|---|---|---|
| 4 | 195 | 168 |
| 5 | 185 | 141 |
| 6 | 175 | 136 |
| 7 | 165 | 124 |
| B | 175 | 95 |
| C | 165 | 92 |

TABLE 3

Effect of Phosphite Quantity

| Test | Triphenyl Phosphite Added [% by Wt.] | J [cm$^3$/g] |
|---|---|---|
| 8 | 1 | 132 |
| 9 | 1.5 | 135 |
| 10 | 2.5 | 135 |
| 11 | 3 | 130 |

TABLE 4

Time Dependency of Condensation

| Test | Triphenyl Phosphite Added [% by Wt.] | J [cm$^3$/g] After 1 | 3 | 5 Hours |
|---|---|---|---|---|
| 12 | 2 | 109 | 122 | 142 |
| 13 | 3 | 116 | 125 | 137 |

TABLE 5

| Test | Polyester | Phosphite Added [% by Wt.] | T [°C.] | N$_2$ [l/h] | t [h] | J [cm$^3$/g] |
|---|---|---|---|---|---|---|
| 14 | Poly(ethylene terephthalate) J = 65 cm$^3$/g; T$_m$ = 255° C. | 2.5 Tri-o-cresyl phosphite | 210 | 0.15 | 4 | 104 |
| 15 | Copolyester of terephthalic acid/isophthalic acid//butanediol = 90/10//100 mol-% J = 85 cm$^3$/g; T$_m$ = 213° C. | 1.5 Triphenyl phosphite | 175 | 0.3 | 6 | 128 |
| 16 | Copolyester of terephthalic acid/sebacic acid //1,4-butanediol = 85/15//100 mol-% J = 86 cm$^3$/g; T$_m$ = 207° C. | 1.5 Diphenyldecyl phosphite | 165 | 0.35 | 7 | 133 |
| 17 | Block copolyester of terephthalic acid//1,4-butanediol/poly(oxytetramethylene)diol (M$_n$ = 1,000) = 100//97/3 mol-% J = 90 cm$^3$/g; T$_m$ = 217° C. | 1.0 Diphenyl p-tert-butylphenyl phosphite | 180 | 0.2 | 4 | 152 |

Condensation Conditions

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for further condensing a linear poly(alkylene terephthalate) having a viscosity number of at least 50 cm$^3$/g in the solid phase at an elevated temperature, comprising condensing the poly(alkylene terephthalate) in an inert gas stream at a temperature 25°-65° C. below the melting point of the poly(alkylene terephthalate) and in the presence of 0.5–5% by weight, based on the amount of poly(alkylene terephthalate), of a phosphorous acid ester of the formula P(OR$_1$)(OR$_2$)(OR$_3$) wherein each of R$_1$, R$_2$ and R$_3$ is independently C$_{1-12}$ alkyl, C$_{6-10}$-aryl, C$_{5-12}$-cycloalkyl, or C$_{6-10}$-aryl or C$_{5-12}$-cycloalkyl each substituted by C$_{1-12}$-alkyl, cyclohexyl, phenyl or phenyl-C$_{1-12}$-alkyl, wherein the amount of inert gas passed through the reactor per hour, measured under normal conditions, is 0.5–1.5 times the gross reactor volume.

2. A process of claim 1, comprising condensing the poly(alkylene terephthalate) at a temperature 35°–55° C. below the melting point of the poly(alkylene terephthalate) used.

3. A process of claim 1 wherein the amount of the phosphorous acid ester is 1–3% by weight on the same basis.

4. A process of claim 1 wherein the amount of inert gas passed through per hour is 0.6–1.3 times the gross reactor volume.

5. A process of claim 1 wherein each of R$_1$, R$_2$ and R$_3$ is alkyl and the total number of carbon atoms in R$_1$, R$_2$ and R$_3$ is at least 12.

6. A process of claim 1 wherein R$_1$, R$_2$ and R$_3$ are phenyl, α- or β-naphthyl, cyclopentyl, cyclohexyl, cyclododecyl, o-, m-, or p-methylphenyl, or 2,4- or 4,6-dimethylphenyl.

7. A process of claim 1 wherein R$_1$, R$_2$ and R$_3$ are phenyl, α- or β-naphthyl, o-, m-, or p-methylphenyl or 2,4- or 4,6-dimethylphenyl.

8. A process of claim 1 wherein the phosphorous acid ester is triphenyl phosphite, tris(cresyl) phosphite, tris(tert-butylphenyl) phosphite, or tris(nonylphenyl) phosphite.

9. A process of claim 1 wherein the inert gas is N$_2$.

10. A process of claim 1 wherein the poly(alkylene terephthalate) is poly(ethylene terephthalate) or poly(butylene terephthalate).

11. A process of claim 1 wherein the poly(alkylene terephthalate) has a viscosity number of at least 65 cm$^3$/g.

12. A process of claim 1 wherein the reaction time is 3–10 hours.

13. A poly(alkylene terephthalate) produced by the process of claim 1.

* * * * *